United States Patent
Nozuyama

[11] Patent Number: 6,148,434
[45] Date of Patent: Nov. 14, 2000

[54] APPARATUS AND METHOD FOR MINIMIZING THE DELAY TIMES IN A SEMICONDUCTOR DEVICE

[75] Inventor: Yasuyuki Nozuyama, Tokyo, Japan

[73] Assignee: Kabushiki Kaisha Toshiba, Kawasaki, Japan

[21] Appl. No.: 08/932,175

[22] Filed: Sep. 17, 1997

[30] Foreign Application Priority Data

Sep. 18, 1996 [JP] Japan ..................................... 8-246373

[51] Int. Cl.[7] .................................................. G06F 17/50
[52] U.S. Cl. ............................................................... 716/6
[58] Field of Search ..................... 395/500.05, 500.06, 395/500.07, 500.11; 716/4, 5, 6, 10, 12

[56] References Cited

U.S. PATENT DOCUMENTS

| | | | |
|---|---|---|---|
| 4,827,428 | 5/1989 | Dunlop et al. | 364/491 |
| 5,507,029 | 4/1996 | Granato et al. | 395/500 |
| 5,515,291 | 5/1996 | Omori et al. | 364/488 |
| 5,880,967 | 3/1999 | Jyu et al. | 364/489 |
| 5,896,300 | 4/1999 | Raghavan et al. | 364/491 |

OTHER PUBLICATIONS

Bahar et al. "Symbolic Timing Analysis and Resynthesis for Low Power Combinational Circuits Containing False Paths," IEEE Transactions on Computer–Aided Design of integrated Circuits and Systems, vol. 16, No. 10, p. 1101–1115, Oct. 1997.

Chen et al. "Criticl Path Selection for Performance Optimization," IEEE Transactions on Computer–Aided Design, vol. 12, No. 2, p. 185–195, Feb. 1993.

Dai and Kunihiro "MOSIZ: A Two–Step Transistor Sizing Algorithm based on Optmal Timing Assignment Method for Multi–Stage Complex Gates," 1989 Custom Integrated Circuits Conference, p. 17.3.1–17.3.4, May 1989.

*Primary Examiner*—Paul R. Lintz
*Assistant Examiner*—Leigh Marie Garbowski
*Attorney, Agent, or Firm*—Banner & Witcoff, Ltd.

[57] ABSTRACT

A method and apparatus for lowering the power dissipation for a semiconductor IC without adverse effects on its operation. The method takes into consideration the timing and function of the IC. The methods includes an analysis step to determine the delay time of each logic path by using test patterns, a classifying step for the logic paths corresponding to the delay times on the logic paths, a marking step for a class mark of the group classified in the classifying step to nodes of each logic path, a shrinking step for reducing the size of an element or a basic cell connected to the nodes having the mark of the smaller delay time group in the classified groups, and a confirming step for the delay times on the logic paths.

6 Claims, 5 Drawing Sheets

FIG. 5

| LOGIC PATH | DELAY TIME (ns) | GROUP |
|:---:|:---:|:---:|
| 1<br>2<br>⋮<br>⋮<br>⋮<br>n1 | 20.5<br>20.4<br>⋮<br>⋮<br>⋮<br>16.5 | P1 |
| n2<br>n3<br>⋮<br>⋮<br>⋮<br>nx | 15.5<br>15.3<br>⋮<br>⋮<br>⋮<br>13.6 | P2 |

APPARATUS AND METHOD FOR MINIMIZING THE DELAY TIMES IN A SEMICONDUCTOR DEVICE

BACKGROUND OF THE INVENTION

1. Field of the Invention

The present invention relates to an apparatus and method for minimizing the power dissipation and delay times in logic circuit devices. The invention has particularly application in large scale integrated circuits (LSIs) and very large scale integrated circuits (VLSIs) which are designed using computer aided design (CAD) systems.

2. Description of Related Art

In recent years, portable electric equipment and the batteries used therein are rapidly becoming smaller in size. Thus, it is important that the logic LSIs and VLSIs integrated circuits used in such devices have low power dissipation. Moreover, counter measures against heat dissipation has become very important in recent years for high-performance ICs which operate at frequency in the several hundred MHZ range. Accordingly, implementing a method to minimize heat dissipating is extremely important.

It is well known that most of the power in an IC is used for the charge and discharge cycle of the capacitance load when N channel MOS transistors and P channel MOS transistors are switched in CMOS circuits in LSIs and VSLIs devices. Therefore, it is necessary to consider a reduction in the power dissipation of switching transistors in order to achieve a lower power dissipation.

Generally, power dissipation P required for a CMOS circuit's switching operation is shown in Equation (1) below:

$$P = f \cdot V^2 \cdot (\Sigma \alpha(i) \cdot C(i)) \qquad \text{EQUATION 1}$$

where the frequency of the system clock signal is f, the power supply voltage is V, $\alpha(i)$ is the switching ratio at a node i, and $C(i)$ is a load capacitance at the same note i.

Analyzing Equation (1) suggests various ways for achieving a lower power dissipation. The most basic method is to minimize the individual parameters in Equation (1). For example, lowering the system clock signal frequency or the power supply voltage results in a reduction in power dissipation. Lowering the power supply voltage is especially effective because it can reduce the power dissipation in square proportion. Doing so, however, causes performance deterioration at the same time. Thus, lowering the power supply voltage is not an effective solution in all cases. The ideal solution for achieving low power dissipation should not result in a deterioration in performance of the IC.

Another method of reducing power dissipation is to reduce the switching ratio $\alpha(i)$ at each node. This method inhibits the activation of unnecessary portions of the device in accordance with the operation required to be performed by the device. For example, one such method relies on the use of activation signals for the clock signal. Since this method depends largely on system operation, its effectiveness is often determined by the way in which it is implemented by the IC designer. Moreover, implementation of such a method is often a manual process which depends to a great extent on the knowledge, skill and training of the design engineers. A manual process naturally leads to an inefficient implementation.

Another technique used to lower power dissipation is to reduce load capacity $C(i)$. The load capacity $C(i)$ is shown by Equation (2) below:

$$C(i) = Cd(i) + Cw(i) + Cg(i) \qquad \text{EQUATION 2}$$

where $Cd(i)$ is the diffusion capacitance, $Cw(i)$ is the wiring capacitance, and $Cg(i)$ is the gate capacitance. This method is often implemented using CAD tools because to do so, eliminates the inefficiencies associated with a manual implementation and makes it much easier to observe restrictions on circuit timing.

CAD tools for IC design have improved greatly in recent years and generally fall into two categories, the ones at the element level and the ones at the basic cell-base level. The element level refers to a semiconductor element, for example, a transistor, and the basic cell level refers to a set of elements which perform a function, for example, a NAND gate.

The cell-based processing methods include, for example, the following steps:

(1) preparing basic cells formed of elements with small gate widths or size;

(2) analyzing the design layout to replace basic cells with ones having smaller gate widths; and (3) replacing smaller cells with even smaller cells within the range of the design restrictions.

The element-based processing method is based on minimizing the diffusion capacitance $Cd(i)$ and the gate capacitance $Cw(i)$ as much as possible without adversely effecting required circuit characters, such as timing. Circuit timing is analyzed after designing with minimum size elements and the size of some elements are then increased as required in order to correct for adverse timing effects. This operation is repeated until the results of the analysis meet the design requirements.

Recently, a method of reducing power dissipation using several levels of power supply voltages at each node was proposed. In this method, power dissipation P is shown in Equation (3).

$$P = f \cdot (\Sigma V(i)^2 \cdot \alpha(i) \cdot C(i)) \qquad \text{EQUATION 3}$$

This method is similar to the method used to reduce load capacity $C(i)$ at a point that $V(i)$ is determined by each node after analyzing circuit timing.

The low power dissipation methods used to minimize parameters independently as described above can be expected to show some beneficial effect. However, such methods are not entirely effective. In order to obtain a sufficient result, the load capacitance of the most frequently operating node in actual circuit operation should be made as small as possible. Thus, it is required to optimize $\alpha(i) \cdot C(i)$ at each node while at the same time meeting timing restrictions and other requirements of the circuit.

The CAD tools for IC circuit design have improved for static optimization, such as a method based on adjusting the load capacitance, as well as for active optimization, such as a method based on adjusting the combination of the layout data and the switching rate of each node in actual circuit operation. However, there is no established method to achieve lower power dissipation in large scale circuits taking into consideration circuit timing restriction.

Although shrinking device size can reduce both load capacitance and power dissipation in general, the device minimization causes the operating speed to be reduced and increases the delay time. Therefore, it is important to adjust the device size to reduce power dissipation while preventing an increase in circuit delay time.

SUMMARY OF THE INVENTION

The overall objective of the present invention is to provide an effective method of reducing the total power dissipation of an IC without increasing the total delay time and to minimize the device size while also suppressing delay time.

The present invention provides a method for optimizing the delay time in a logic device comprising the steps of: analyzing the delay time of each logic path by using test patterns; classifying the logic paths corresponding to the delay times on the logic paths; marking a class mark of the group classified in the classifying step to nodes of each logic path; shrinking the size of an element or basic cell connected to the nodes having the mark of the smaller delay time group in the classified groups; and confirming the delay times on the logic paths.

The present invention also provides an apparatus for minimizing the delay time in a logic device and includes: a memory device for keeping connecting information of the logic device; a device for analyzin the delay time of each logic path by using test patterns stored in the memory device; a device for classifying the logic paths corresponding to the delay times on the logic paths and storing the result in the memory device; a device for marking a class mark of the classified group to nodes of each logic path and storing the result in the memory device; a device for shrinking the size of an element or a basic cell connected to the nodes having the mark of the smaller delay time group in the classified groups; and a device for confirming the delay times on the logic paths.

The invention will now be described by way of example with reference to the accompanying drawings in which:

BRIEF DESCRIPTION OF THE DRAWING

FIGS. 4 and 5 illustrate the classifying method of the present invention.

DETAILED DESCRIPTION OF THE PREFERRED EMBODIMENTS

Figure 1:
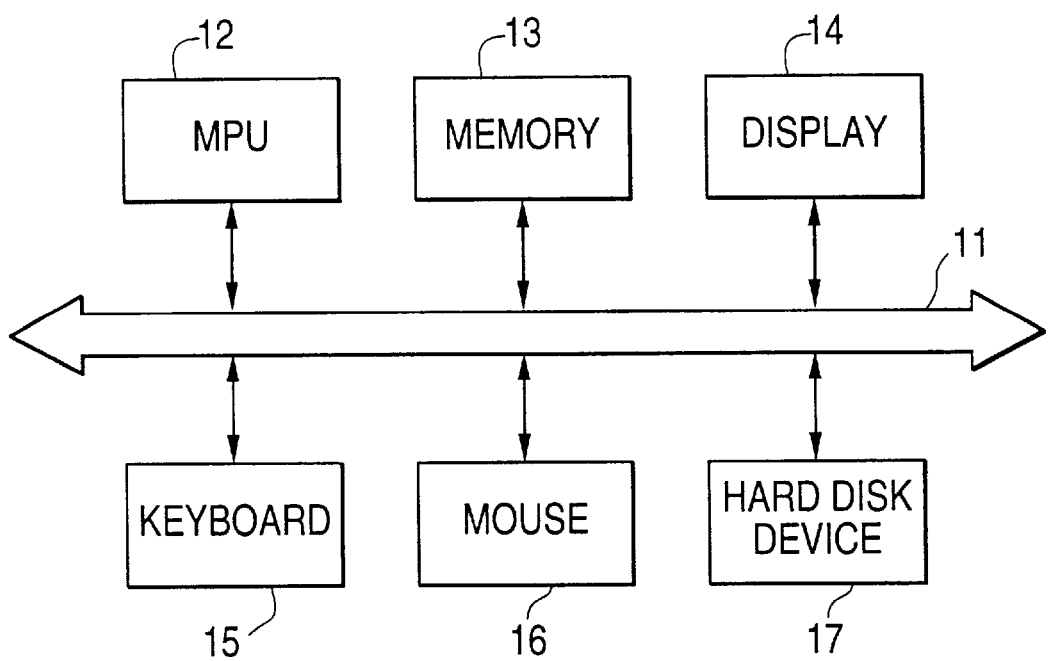
FIG. 1 is a block diagram of an engineering work station which can be used to practice the present invention.

FIG. 1 illustrates a standard computer system, such as an engineering work station) which may be used to practice the present invention. The system includes a microprocessor unit (MPU) 12 connected to a system bus 11, a main memory 13, a display 14, a keyboard 15, a mouse 16, and a hard disc device 17. The hard disc device 17 involves various programs and information regarding the construction and design of semiconductor ICs, such as logic net data, layout data of transistors or other elements, manufacturing process data, test patterns, optimization programs for low power dissipation, timing analysis tools, arranging tools for the size of basic cells or IC chips and programs to output the operation results. Display 14 is used to display such information as data input from keyboard 15 or data pointed to by mouse 16, processing conditions and processing results from MPU 12.

The operation of the present invention will be explained with reference to FIGS. 2, 3, 4, and 5.

The present invention reduces power dissipation in exchange for the delay time due to reducing the size of semiconductor elements having less delay times on a logic path. Generally, when the size of semiconductor elements is reduced, the power dissipation decreases but the delay time increases.

Figure 2A:
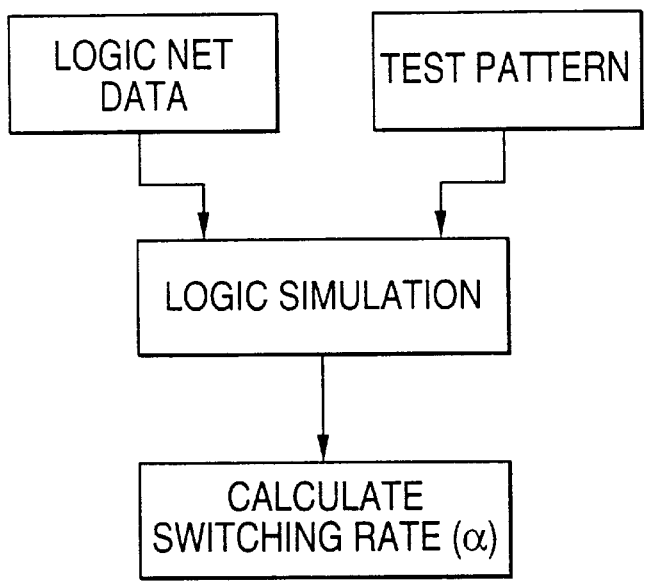
FIG. 2 is a flow chart which illustrated the operation of the present invention.
Figure 2B:
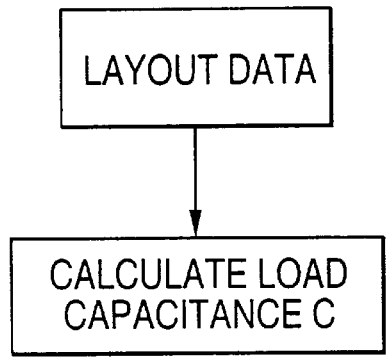

As shown in FIGS. 2(a) and (b), the switching ratio and the load capacities at each node of a circuit for optimization is calculated prior to the optimization process. The switching ratio at each node is obtained by logic simulation using a test pattern based on logic net data as shown in FIG. 2 (a). One well-known tool which may be used for conducting logic simulation is produced by Verilog Corporation.

The load capacitance at each node can be obtained by using layout data or manufacturing process data. For the load capacitance, the diffusion capacitance Cd, the wiring capacitance Cw and the gate capacitance Cg are maintained separate from each other.

Figure 3:
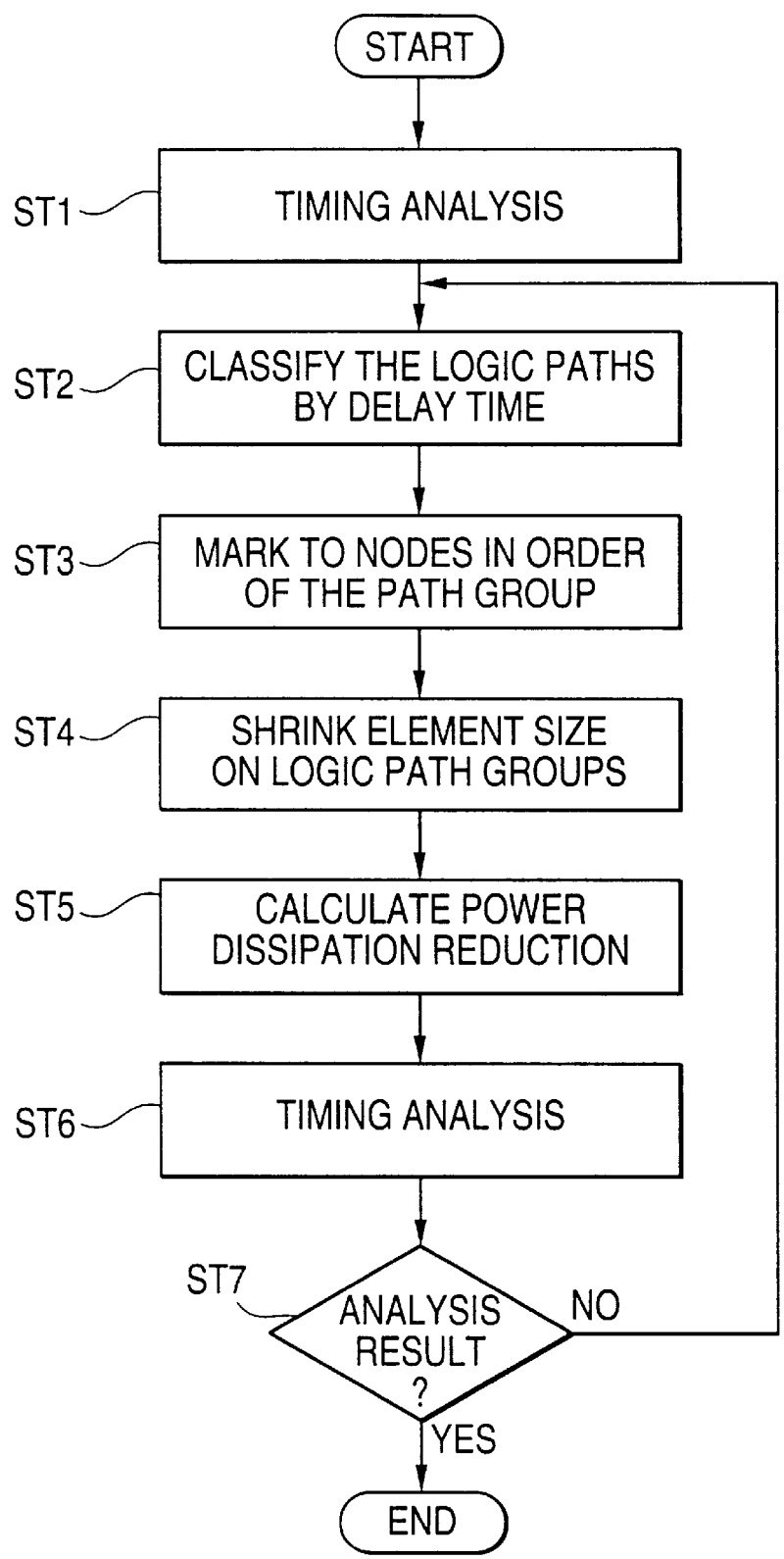
FIG. 3 is another flow chart which illustrates the operation of the present invention.

And as shown in FIG. 3, an optimization program is implemented. First, a timing analyzing program analyzes the operation timing of each node in the semiconductor IC for optimization. Then, logic paths (critical paths) and nodes relating thereto are extracted (ST1).

Next, the delay times are calculated on the extracted logic paths. The delay time on the logic paths are compared and classified to groups in order of the delay times on the logic paths (ST2). In other words, the logic paths are grouped by delay times within a predetermined range, such as the logic paths with the greatest delay time are labeled group P1, the next logic paths are labeled group P2 and so on. For example, the logic paths with 16 ns or more delay time are put into group P1, and those with a lesser delay time are put into group P2, as shown in FIG. 5. Although the groups are segregated into two categories in this embodiment, they can also be divided into additional groups. However, the number of groups must be chosen experimentally because the number of repeat calculations must increase in order to obtain the most effective results if the number of groups is increased.

The delay times on the logic paths of group P2 are relatively small so that the nodes on the logic paths can be reduced in size in order to reduce power dissipation with little effect on delay times.

All nodes of basic cells in the group of logic paths with the largest delay times are labeled and the nodes of the next group and so on (ST3). After all nodes of the basic cells and the I/O terminal on the logic paths relating to group P1 are extracted, these nodes are labeled "P1". Subsequently, after all nodes relating to group P2 are extracted, these nodes are labeled "P2". When a node has labels of both group P1 and group P2, the node is labeled to indicate the largest delay time group, that is "P1".

Figure 4:
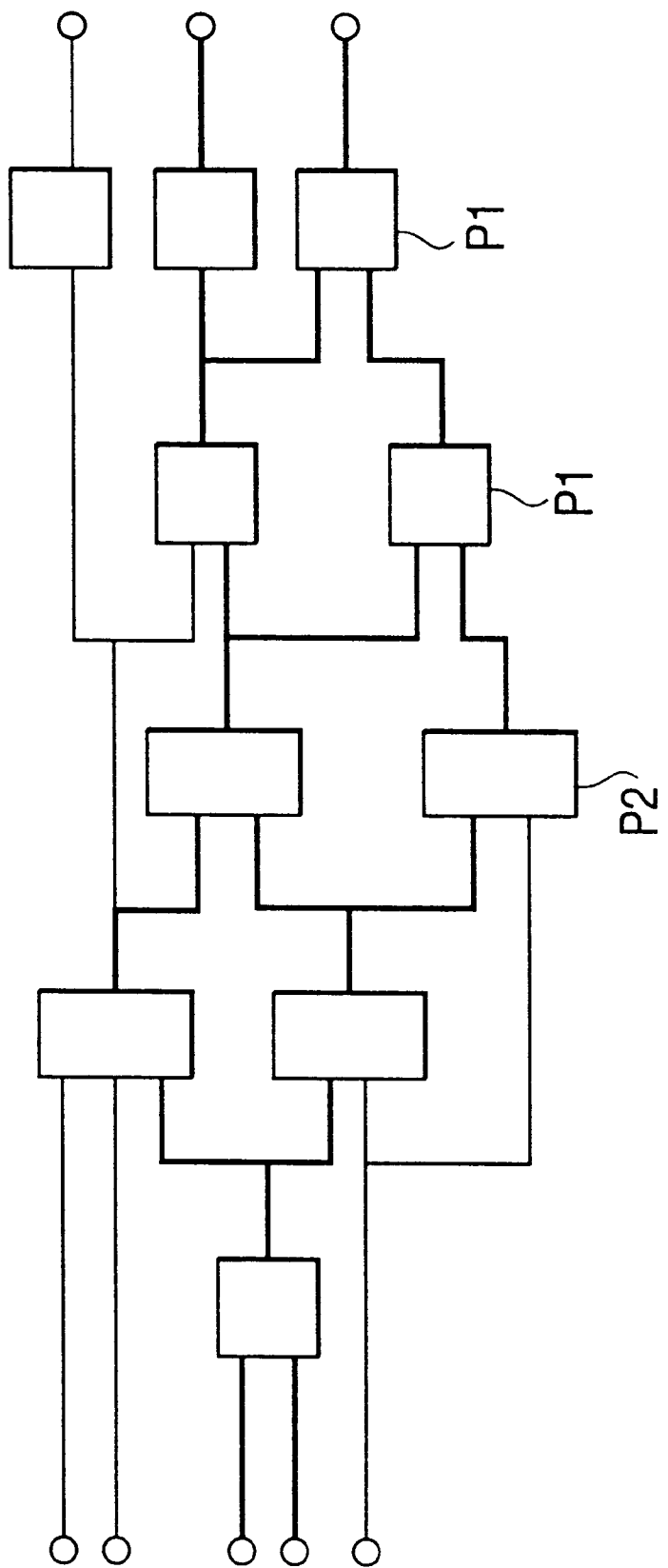

In FIG. 4, a rectangle shows basic cells which usually include a plurality of semiconductor elements and signals which propagate from left to right in the drawing. For explaining, thick lines show the logic paths in group P1, which have the largest delay times, and a thin line shows the logic paths in group P2, which have the next larger delay times. The logic paths are changeable depending on the test patterns and the way in which the logic circuit will be used.

It is presumed that the delay time of the logic paths in group P1 will not increase further. Therefore, semiconductor elements relating to group P1 are excluded from the device for the purpose of size reduction.

The elements on the logic paths having the smallest delay times are reduced first in order to conserve power. In the two groups shown in FIGS. 4 and 5, the elements connected to the nodes labeled "P2", i.e., the elements of group P2, are reduced in size because the logic paths in group P2 have the smaller delay times than the paths in group P1. In FIG. 4, since a thin line illustrates logic paths which belong to group P2, the nodes of the basic cells connected to the thin line are labeled with "P2". The sizes of the elements connected to the nodes having the P2 labels are reduced. For shrinking the size of the elements and basic cells, the elements and cells which have the larger value in the product αC for the switching ratio α and the load capacitance C are reduced until the delay times at the nodes increases up to predetermined values. The product αC has a great effect on the reduction in power dissipation. When basic cells have the product αC and (αC)'of the switching ratio α and the load capacitance C on the path in the group P2, and (αC)'<αC, the basic cell αC is reduced until (αC)'=αC within an allowable range of the delay time. An appropriate selection can thus be made with respect to reducing the size of the elements or the basic cells.

The increase of the delay time at a node due to the reduction of the size of the element or the basic cell can be estimated by dividing the difference in the average delay times between groups P1 and P2 by the number of basic cells on one logic path in group P2 to which the element or the basic cell belongs. For example, if the difference in the mean delay times between the logic paths in groups P1 and P2 is about 2 ns and the number of the basic cells on a logic path in group P2 is 10, the increase in the delay time at a node is about 0.2 ns. That is, the difference between the delay times of the logic paths between group P1 and P2 is distributed to every node. This operation is repeated until the delay time for group P2 is nearly equal to that for group P1.

As a result, the delay times for group P2 becomes equivalent to the delay times for group P1 so that an optimized circuit with the lowest power dissipation can be obtained. The delay times in group P1 never increases because the load capacitance is lowered by shrinking sizes only in group P2. If there is a group P3 in which the average delay time is smaller than that of group P2, the size of the elements or basic cells included in group P3 will first be reduced so that the delay time for group P3 can be equivalent to that for group P2. Afterwards, the size of the elements or basic cells included in groups P2 and P3 should be reduced so that the average delay times for groups P3 and P2 are equivalent that for group P1.

After this process is completed, the resulting power dissipation reduction is estimated and pertinent data is output (ST5).

Subsequently, circuit timing is estimated by the timing analyzing program of step ST1 in order to verify the function of the semiconductor IC (ST6). When the result is appropriate, the process to optimize is completed. However, if the result is not appropriate, the operation returns to step ST2 from step ST7.

After the logical paths are classified to groups in order of the delay times on the logic paths pursuant to the timing analysis results, the sizes of the elements or basic cells on the paths in the lesser delay time groups are reduced in sequence. Therefore, lower power dissipation with stable operation of the semiconductor IC can be achieved because the size of the elements or basic cells are reduced taking into consideration the effects on timing. Moreover, the operating speed of the semiconductor IC is maintained because the elements of the basic cells in the largest delay time group are not reduced in size.

Reduction element size can often cause the IC switching rate to decrease and through current to increase at buffer circuits, etc. Therefore, it is recommended to established a lower limit with respect to size reduction.

Although the embodiment of the invention, as described above, reduces the size of elements or basic cells based on the delay time of the nodes on each logic path, the invention is not limited thereto. For example, it is also possible to reduce the size of the elements basic cells in accordance with delay time with consideration of, for example, the setup time and hold time for flip-flop circuits or other timing parameters. In this case, the delay times on logic paths should be calculated at step ST1 and step ST2.

The present invention provides optimization methods and apparatus for semiconductor ICs which can lower power dissipation effectively while at the same time providing stable operation. It should be obvious, however, from the above-discussed method and apparatus embodiment that numerous other variations and modifications of this invention are possible, and such will readily occur to those skilled in the art. Accordingly, the scope of this invention is not to be limited to the embodiment disclosed, but is to include any such embodiments as may be encompassed within the scope of the claims appended hereto.

What is claimed is:

1. A method for optimizing the delay time in a logic device, comprising the steps of:

analyzing a delay time of each logic path;

classifying the logic paths corresponding to the delay times on the logic paths as logic paths groups;

marking a class mark of the group classified in the classifying step to nodes of the each logic pass;

extracting a first logic path group having the largest delay time;

increasing the delay times of a second logic path group having smaller delay time than the first logic path until the delay times of the second logic path group are substantially the same as the delay times of the first logic path group; and confirming the delay times on the logic paths.

2. A method for optimizing the delay time in a logic device, comprising the steps of:

analyzing a delay time of each logic path;

classifying the logic paths corresponding to the delay times on the logic paths as logic path groups;

marking a class mark of the group classified in the classifying step to nodes of the each logic path;

extracting a first logic oath group having the largest delay time;

shrinking a size of an element of a basic cell connected to the nodes having the mark of a second logic path group having the smaller delay times than the first logic path group until the delay times of the second logic path group are substantially the same as the delay times of the first logic path group; and confirming the delay times on the logic paths.

3. A method for optimizing the delay time in a logic device according to claim 2, wherein the logic paths are classified into two or three groups.

4. A method for optimizing the delay time in a logic device according to claim 2, wherein the shrinking step is arranging the delay time of the element of the basic cell to lower power dissipation.

5. A method for optimizing the delay time in a logic device according to claim 2, wherein the shrinking step is repeated until the delay times on the logic paths correspond to the delay times on the logic paths in the group classified as the largest delay times.

6. A method for optimizing the delay time in a logic device, comprising the steps of:

analyzing a delay time of each logic path by using test patterns;

classifying the logic paths corresponding to the delay times on the logic paths;

marking a class mark of the group classified in the classifying step to nodes of the each logic pass;

shrinking a size of an element or a basic cell connected to the nodes having the mark of the smaller delay time group in the classified groups; and confirming the delay times on the logic paths, wherein the shrinking step begins from an element having larger product of a switching ratio and a load capacitance in the logic path.

* * * * *